United States Patent
Wang et al.

(10) Patent No.: US 10,901,538 B2
(45) Date of Patent: Jan. 26, 2021

(54) PEN MOUSE

(71) Applicant: PixArt Imaging Inc., Hsin-Chu (TW)

(72) Inventors: Yen-Chang Wang, Hsin-Chu (TW); Tsung-Fa Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 16/234,534

(22) Filed: Dec. 27, 2018

(65) Prior Publication Data
US 2020/0209993 A1    Jul. 2, 2020

(51) Int. Cl.
*G06F 3/033* (2013.01)
*G06F 3/0354* (2013.01)
*G06F 21/32* (2013.01)
*G06F 3/038* (2013.01)
*G06F 3/03* (2006.01)

(52) U.S. Cl.
CPC .......... *G06F 3/03546* (2013.01); *G06F 3/038* (2013.01); *G06F 3/0312* (2013.01); *G06F 21/32* (2013.01); *G06F 3/0317* (2013.01); *G06F 3/0383* (2013.01)

(58) Field of Classification Search
CPC .... G06F 3/03546; G06F 3/038; G06F 3/0312; G06F 21/32; G06F 3/0317; G06F 3/0383
See application file for complete search history.

(56) References Cited

U.S. PATENT DOCUMENTS

| | | | | |
|---|---|---|---|---|
| 6,633,282 B1* | 10/2003 | Monroe | ............. | G06F 3/03545 |
| | | | | 178/19.03 |
| 2003/0214490 A1* | 11/2003 | Cool | ................... | G06F 3/03545 |
| | | | | 345/179 |
| 2004/0041798 A1* | 3/2004 | Kim | ..................... | G06F 1/1626 |
| | | | | 345/179 |
| 2004/0150632 A1* | 8/2004 | Clapper | .............. | G06F 3/03545 |
| | | | | 345/179 |
| 2005/0264542 A1* | 12/2005 | Yueh | .................... | G06F 3/03545 |
| | | | | 345/179 |
| 2006/0028456 A1* | 2/2006 | Kang | .................... | G06F 3/0312 |
| | | | | 345/179 |
| 2007/0279399 A1* | 12/2007 | Nishimura | .......... | G06F 3/03546 |
| | | | | 345/179 |
| 2011/0298709 A1* | 12/2011 | Vaganov | ............. | G06F 3/03545 |
| | | | | 345/158 |
| 2015/0015489 A1* | 1/2015 | Vaganov | ............. | G06F 3/03545 |
| | | | | 345/158 |
| 2016/0116998 A1* | 4/2016 | Ishikawa | ............. | G06F 3/03545 |
| | | | | 345/179 |

FOREIGN PATENT DOCUMENTS

| | | | | |
|---|---|---|---|---|
| GB | 2396399 A | * | 6/2004 | ......... G06F 3/03546 |
| WO | WO-9932958 A1 | * | 7/1999 | ......... G06F 3/03546 |

* cited by examiner

*Primary Examiner* — Adam J Snyder
(74) *Attorney, Agent, or Firm* — Winston Hsu

(57) ABSTRACT

A pen mouse includes a housing, a rotatable actuator, an optical sensor and a processor. The rotatable actuator is movably disposed inside the housing along a structurally longitudinal direction and a structurally horizontal direction of the housing. The optical sensor is adapted to detect surface reflection of the rotatable actuator. The processor is electrically connected with the optical sensor and adapted to compute a rotating direction, a rotating angle and depth variation of the rotatable actuator via analysis of the surface reflection.

11 Claims, 4 Drawing Sheets

PEN MOUSE

BACKGROUND OF THE INVENTION

1. Field of the Invention

The present invention relates to a pen mouse, and more particularly, to a pen mouse capable of outputting correct coordinates no matter how the user handles the pen mouse.

2. Description of the Prior Art

A conventional optical pen mouse utilizes an optical navigation chip disposed on a pen tip to read a moving trace of the pen tip on a reference plane. The moving trace is transmitted to an external electronic device and can be displayed on a screen. The optical navigation chip is disposed inside the pen tip of normal and acceptable look; when the optical pen mouse is handled for writing characters or drawing patterns, the pen tube of the optical pen mouse is inclined relative to the reference plane, and the optical navigation chip is slightly oblique relative to the reference plane because of an inclination angle. As the optical pen mouse is operated to draw a horizontal line on the reference plane, a line displayed on the screen is oblique than the horizontal line.

For solving the above-mentioned mistake, the conventional optical pen mouse disposes the optical navigation chip obliquely inside the pen tip to overcome the mistake of the drawing line being inconsistent with the digital line displayed on the digital image. However, the inclination angle generated by handling the optical pen mouse is varied according to a palm size, a posture habit and a writing environment of the user. Handwriting deviation (such like inconsistency of the drawing line and the digital line displayed on the digital image) cannot be effectively overcome by conventional hardware calibration of disposing the optical navigation chip obliquely inside the pen mouse.

SUMMARY OF THE INVENTION

The present invention provides a pen mouse capable of outputting correct coordinates no matter how the user handles the pen mouse for solving above drawbacks.

According to the claimed invention, a pen mouse includes a housing, a rotatable actuator, an optical sensor and a processor. The rotatable actuator is movably disposed inside the housing along a structurally longitudinal direction and a structurally horizontal direction of the housing. The optical sensor is adapted to detect surface reflection of the rotatable actuator. The processor is electrically connected with the optical sensor and adapted to compute a rotating direction, a rotating angle and depth variation of the rotatable actuator via analysis of the surface reflection.

According to the claimed invention, the rotatable actuator is moved along the structurally longitudinal direction in response to an external pressure applied to the rotatable actuator, and further moved along the structurally horizontal direction in response to a shifting of the pen mouse. The rotatable actuator includes a holder and a roller. The holder is fixed inside the housing, and the roller is assembled with the holder in a loose fit manner. The roller is rotatable at a first position of the holder and further movable between the first position and a second position of the holder. The roller is rotatable at the second position.

According to the claimed invention, the rotatable actuator further includes a resilient component disposed between the holder and the roller, and the roller is moved from the second position to the first position by a recovering force of the resilient component. The optical sensor detects position change of the roller, and the processor is adapted to discontinuously adjust a trace width of the pen mouse according to analysis of the position change. The optical sensor detects an interval between the optical sensor and the roller, and the processor is adapted to continuously adjust a trace width of the pen mouse according to analysis of the interval.

According to the claimed invention, the pen mouse further includes a memory electrically connected with the processor and adapted to store preset trace information of the rotatable actuator. The preset trace information is the rotating direction, the rotating angle and the depth variation. The processor compares a current trace generated by the rotatable actuator with the preset trace information for biological identification.

The pen mouse of the present invention can utilize the rotatable actuator to detect the movement of the pen mouse relative to the reference plane. The pen mouse may be inclined when being handled by the user, and the rotating direction, the rotating angle and the depth variation of the rotatable actuator are the same no matter how an inclined angle of the pen mouse is varied. The rotating direction and the rotating angle can be transformed into a trace of the pen mouse, and the depth variation can be transformed into the trace width of the pen mouse. Therefore, the present invention can analyze the varied parameter of the rotatable actuator to generate coordinates of the trace, and have the movable roller recovered by the resilient component to provide pressure detecting function without any pressure sensor. The optical sensor of the present invention is used to detect the surface reflection of the rotatable actuator, instead of the feature point on the reference plane. Rotation of the rotatable actuator can be directly and correctly transformed into the moving trace of the pen mouse without any compensation, therefore the pen mouse of the present invention is easy to handle and operate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
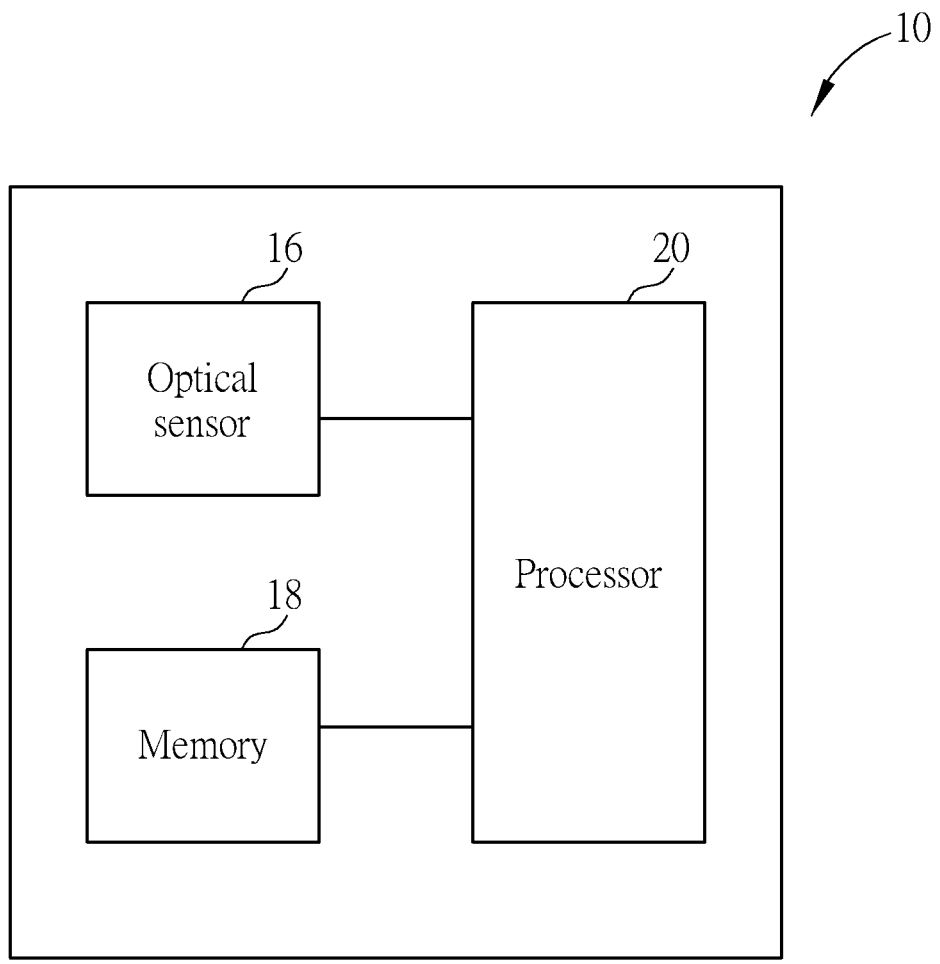
FIG. 1 is a functional block diagram of a pen mouse according to an embodiment of the present invention.
Figure 2:
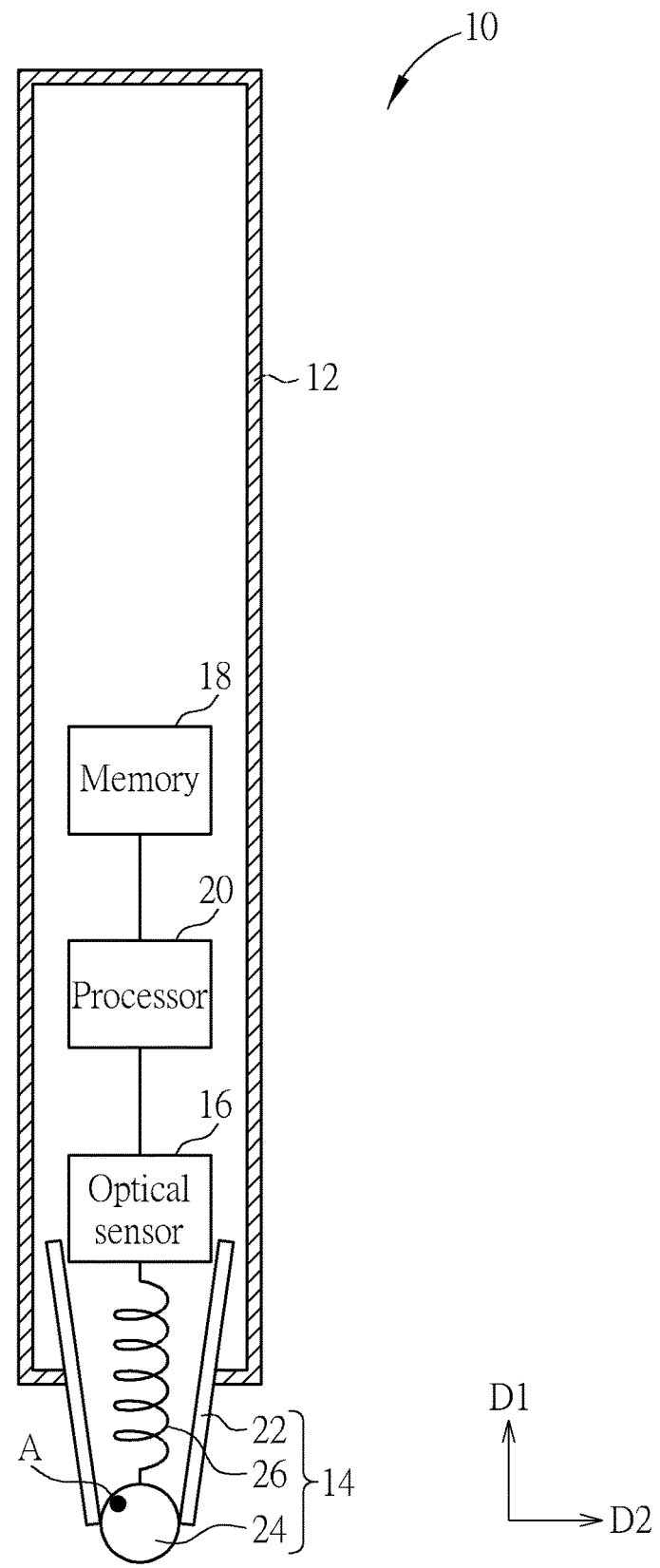
FIG. 2 is a schematic diagram of the pen mouse according to the embodiment of the present invention

Please refer to FIG. 1 and FIG. 2. FIG. 1 is a functional block diagram of a pen mouse 10 according to an embodiment of the present invention. FIG. 2 is a schematic diagram of the pen mouse 10 according to the embodiment of the present invention. The pen mouse 10 can include a housing 12, a rotatable actuator 14, an optical sensor 16, a memory 18 and a processor 20. The housing 12 is used to accommodate all the other structural components. The rotatable actuator 14 can be moved relative to the housing 12 along a structurally longitudinal direction D1 and a structurally horizontal direction D2 of the housing 12. The processor 20 can be electrically connected to the optical sensor 16 and the memory 18. The optical sensor 16 can detect surface reflection of the rotatable actuator 14. The processor 20 can analyze the surface reflection and accordingly compute varied parameters of the rotatable actuator 14 for deciding a trace of the pen mouse 10. The memory 18 may store preset trace information of the rotatable actuator 14 for comparing with a truly detected trace.

The rotatable actuator 14 can include a holder 22, a roller 24 and a resilient component 26. The holder 22 can be fixed inside the housing 12. The roller 24 can be a ball or any similar structures assembled with the holder 22 in a loose fit manner. The resilient component 26 can be disposed between the holder 22 and the roller 24, so that a recovering force of the resilient component 26 can move the roller 24 relative to the holder 22. The holder 22 may partly protrude from the housing 12, and the roller 24 is movably assembled with the holder 22 as a pen tip of the pen mouse 10. Further, the holder 22 may be hidden inside the housing 12, and the roller 24 movably assembled with the holder 22 can partly protrude from the housing 12 as the pen tip of the pen mouse 10.

Figure 3:
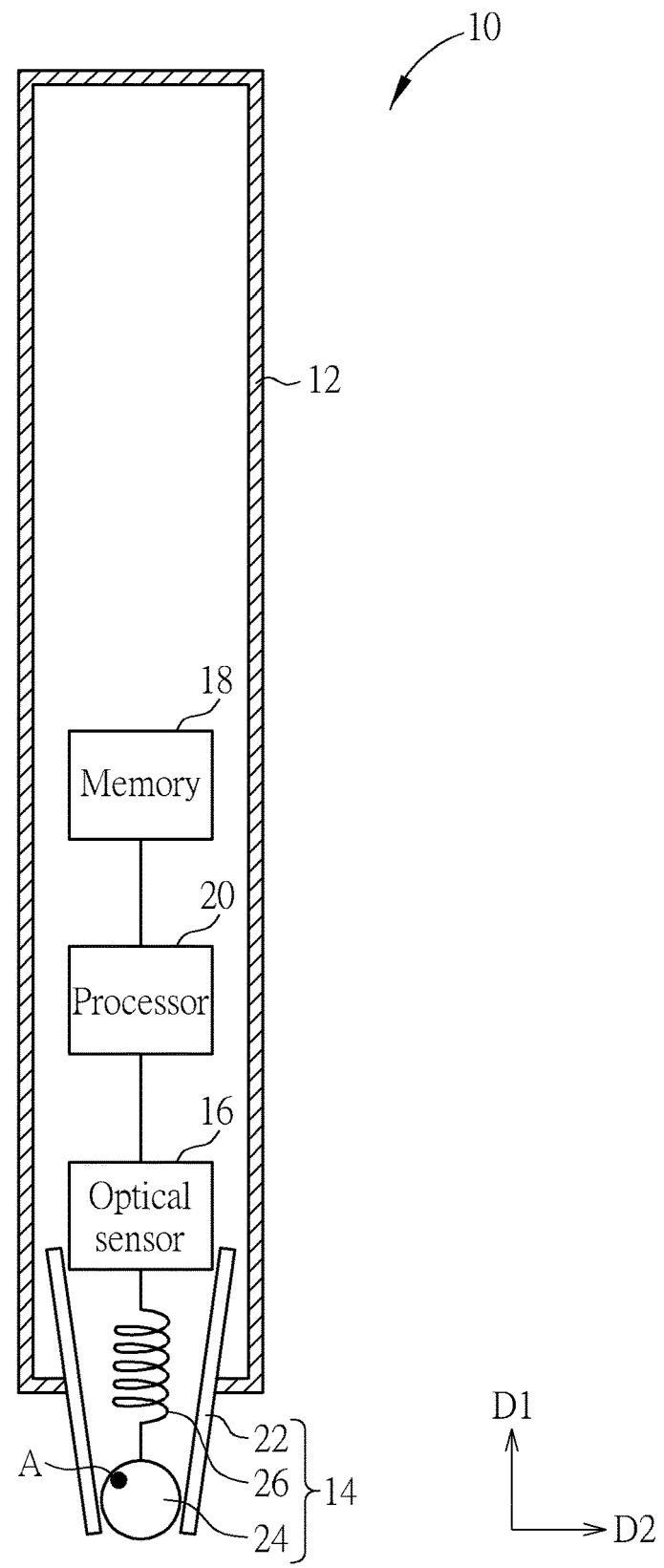
FIG. 3 is a schematic diagram of the pen mouse in another situation different a situation shown in FIG. 2.

Please refer to FIG. 2 and FIG. 3. FIG. 3 is a schematic diagram of the pen mouse 10 in another situation different a situation shown in FIG. 2. The rotatable actuator 14 can be moved along the structurally longitudinal direction D1 and the structurally horizontal direction D2 of the housing 12. When the pen mouse 10 contacts against a reference plane (which is not in figures), the roller 24 can move relative to the holder 22 along the structurally longitudinal direction D1 in response to an external pressure applied to the rotatable actuator 14. For example, as shown in FIG. 2, a user handles the pen mouse 10 to slightly draw a line, and most of the roller 24 can protrude from the housing 12; as shown in FIG. 3, the user handles the pen mouse 10 to draw the line hard, and the roller 24 can be moved along the structurally longitudinal direction D1 to hide inside the housing 12; a part of the roller 24 may be outside the housing 12.

Figure 4:
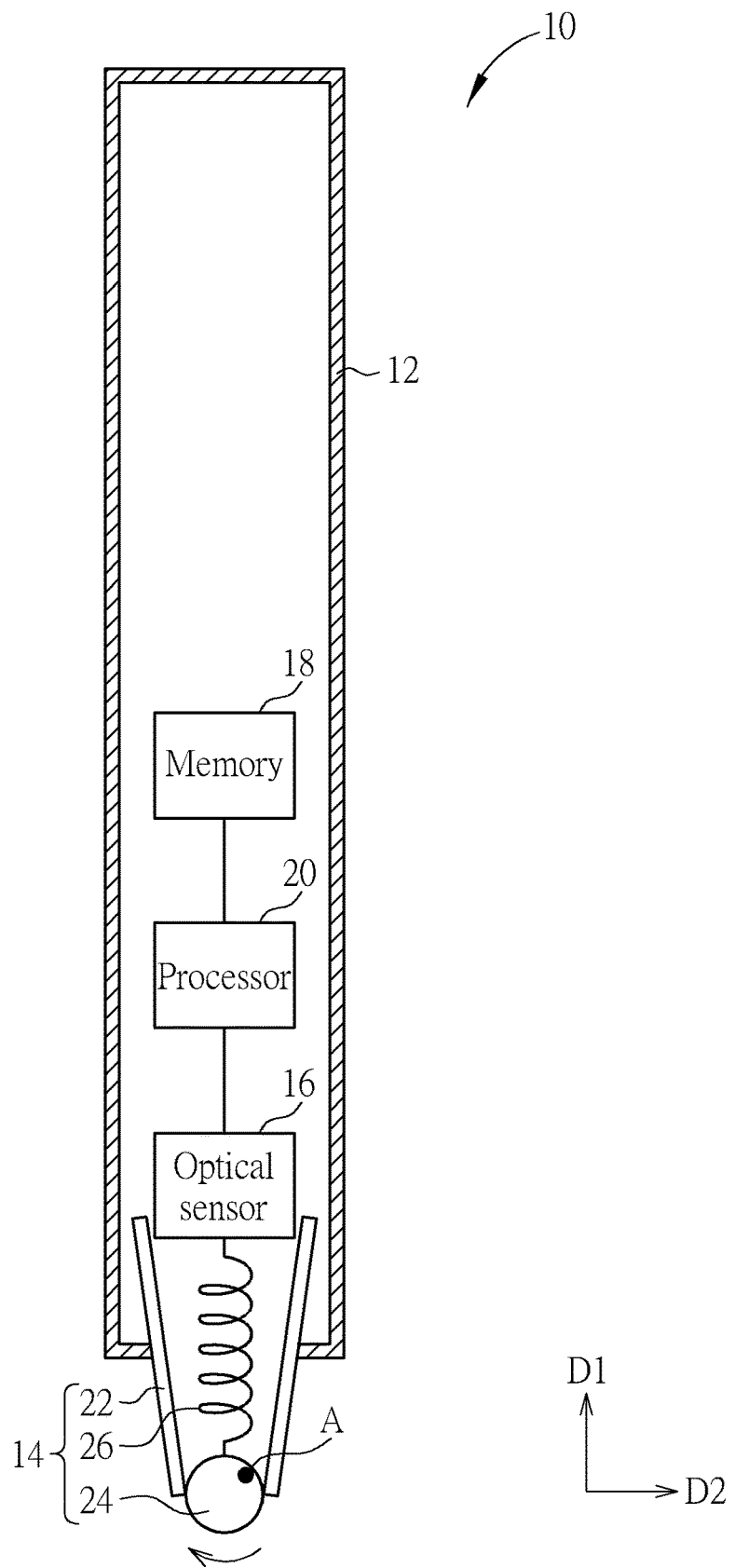
FIG. 4 is another schematic diagram of the pen mouse in another situation different a situation shown in FIG. 2.

Please refer to FIG. 2 and FIG. 4. FIG. 4 is another schematic diagram of the pen mouse 10 in another situation different a situation shown in FIG. 2. When the pen mouse 10 is shifted over the reference plane, the roller 24 can be rolled relative to the reference plane along the structurally horizontal direction D2 due to friction. For instance, when the pen mouse 10 is shifted on the reference plane from left to right, a feature point A or texture on the roller 24 may rotate in a clockwise direction, which may be interpreted as moving along the structurally horizontal direction D2, therefore the optical sensor 16 can detect the surface reflection (such as motion of the feature point A or the texture on the roller 24) to compute the varied parameters of the rotatable actuator 14 and decide the trace of the pen mouse 10.

The varied parameters can be a rotating direction, a rotating angle and depth variation of the rotatable actuator 14. The rotating direction of the rotatable actuator 14 can indicate a moving direction of the pen mouse 10 relative to the reference plane; the rotating angle of the rotatable actuator 14 can indicate a moving distance of the pen mouse 10 relative to the reference plane; the depth variation of the rotatable actuator 14 can indicate a quantity of the external pressure applied to the pen mouse 10. The roller 24 can be movable between a first position of the holder 22 (which can be shown in FIG. 2) and a second position of the holder 22 (which can be shown in FIG. 3). The roller 24 positioned at the first position can rotate relative to the holder 22 for generating variation of the rotating direction and the rotating angle. The roller 24 positioned at somewhere between the first position and the second position can rotate relative to the holder 22. The roller 24 positioned at the second position may be rotatable or unrotatable.

As the external pressure applied to the pen mouse 10 is decreased or removed or the pen mouse 10 is spaced from the reference plate, the roller 24 can be recovered from the second position to the first position via the recovering force of the resilient component 26. The resilient component 26 preferably can be a compression spring or a torsional spring (which is not shown in figures). In a possible embodiment, the resilient component 26 may be replaced by some mechanism capable of recovering the roller 24. In another possible embodiment, the resilient component 26 may be removed, and the roller 24 can be recovered from the second position to the first position via gravity when the pen mouse 10 does not have the resilient component.

In the present invention, position change of the roller 24 can represent pressure variation applied to the pen mouse 10. The pen mouse 10 can set that the roller 24 positioned in specific positions are used to adjust a trace width of the pen mouse 10, and the said specific positions can be the first position and the second position mentioned above. The optical sensor 16 detects the roller 24 is in the first position, and the processor 20 can adjust the trace width of the pen mouse 10 equal to a first width; the optical sensor 16 detects the roller 24 is in the second position, and the processor 20 can adjust the trace width of the pen mouse 10 equal to the second wider than the first width. It is to say, the processor 20 can analyze the position change of the roller 24 to discontinuously adjust the trace width of the pen mouse 10. Moreover, the optical sensor 16 may detect and compute an interval between the optical sensor 16 and the roller 24, so the processor 20 can analyze and transform the said interval into variation of the trace width accordingly; the processor 20 can continuously adjust the trace width of the pen mouse 10. The position change of the roller 24 and the interval between the optical sensor 16 and the roller 24 can be represented by size change of the feature point A or a reflecting period of an optical signal emitted by the optical sensor 16.

The memory 18 can store the preset trace information of the rotatable actuator 14, which may be the rotating direction, the rotating angle and the depth variation for representing a signature of the user. As the pen mouse 10 is handled to draw a current trace, the processor 20 can compare the current trace generated by the rotatable actuator 14 with the preset trace information for biological identification. The user can be identified as an authorized operator when the current trace conforms to the preset trace information, and further be identified as an unauthorized operator when the current trace does not conform to the preset trace information. Functions of the pen mouse 10 can be unlocked for the authorized operator, and the pen mouse 10 may lock the functions or output an alarm when the unauthorized operator is identified.

In conclusion, the pen mouse of the present invention utilizes the rotatable actuator to detect a movement of the pen mouse relative to the reference plane. The pen mouse may be inclined when being handled by the user, and the rotating direction, the rotating angle and the depth variation of the rotatable actuator are the same no matter how an inclined angle of the pen mouse is varied. The rotating direction and the rotating angle can be transformed into a trace of the pen mouse, and the depth variation can be transformed into the trace width of the pen mouse. Therefore, the present invention can analyze the varied parameter of the rotatable actuator to generate coordinates of the trace, and have the movable roller recovered by the resilient component to provide pressure detecting function without any pressure sensor. Comparing to the prior art, the optical sensor of the present invention is used to detect the surface reflection of the rotatable actuator, instead of the feature point on the reference plane. Rotation of the rotatable actuator can be directly and correctly transformed into the moving trace of the pen mouse without any compensation, therefore the pen mouse of the present invention is easy to handle and operate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pen mouse, comprising:
a housing;
a rotatable actuator movably disposed inside the housing along a structurally longitudinal direction and a structurally horizontal direction of the housing;
an optical sensor adapted to detect surface reflection of the rotatable actuator;
a processor electrically connected with the optical sensor and adapted to compute a rotating direction, a rotating angle and depth variation of the rotatable actuator via analysis of the surface reflection, and further adapted to utilize an analysis result of the surface reflection to detect an inclined deviation of the pen mouse and immediately compensate an inclined angle of the pen mouse so that the pen mouse outputs an accurate trace no matter how the inclined angle of the pen mouse is continuously varied.

2. The pen mouse of claim 1, wherein the rotatable actuator is moved along the structurally longitudinal direction in response to an external pressure applied to the rotatable actuator, and further moved along the structurally horizontal direction in response to a shifting of the pen mouse.

3. The pen mouse of claim 1, wherein the rotatable actuator comprises a holder and a roller, the holder is fixed inside the housing, and the roller is assembled with the holder in a loose fit manner.

4. The pen mouse of claim 3, wherein the roller is rotatable at a first position of the holder and further movable between the first position and a second position of the holder.

5. The pen mouse of claim 4, wherein the roller is rotatable at the second position.

6. The pen mouse of claim 4, wherein the rotatable actuator further comprises a resilient component disposed between the holder and the roller, and the roller is moved from the second position to the first position by a recovering force of the resilient component.

7. The pen mouse of claim 3, wherein the optical sensor detects position change of the roller, and the processor is adapted to discontinuously adjust a trace width of the pen mouse according to analysis of the position change.

8. The pen mouse of claim 3, wherein the optical sensor detects an interval between the optical sensor and the roller, and the processor is adapted to continuously adjust a trace width of the pen mouse according to analysis of the interval.

9. The pen mouse of claim 1, further comprising:
a memory electrically connected with the processor and adapted to store preset trace information of the rotatable actuator.

10. The pen mouse of claim 9, wherein the preset trace information is the rotating direction, the rotating angle and the depth variation.

11. The pen mouse of claim 9, wherein the processor compares a current trace generated by the rotatable actuator with the preset trace information for biological identification.

* * * * *